US011159281B2

(12) United States Patent
Hawinkel et al.

(10) Patent No.: US 11,159,281 B2
(45) Date of Patent: Oct. 26, 2021

(54) LOW POWER WIDE AREA NETWORK IMPROVED CONTROL OF PACKET RETRANSMISSION

(71) Applicant: Alcatel Lucent, Nozay (FR)

(72) Inventors: Chris Hawinkel, Antwerp (BE); Zhe Lou, Edegem (BE)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 16/465,038

(22) PCT Filed: Nov. 22, 2017

(86) PCT No.: PCT/EP2017/080024
§ 371 (c)(1),
(2) Date: May 29, 2019

(87) PCT Pub. No.: WO2018/104052
PCT Pub. Date: Jun. 14, 2018

(65) Prior Publication Data
US 2019/0386790 A1    Dec. 19, 2019

(30) Foreign Application Priority Data

Dec. 5, 2016 (EP) ..................................... 16306617

(51) Int. Cl.
*H04L 1/18* (2006.01)
(52) U.S. Cl.
CPC ............ *H04L 1/1887* (2013.01); *H04L 1/187* (2013.01)
(58) Field of Classification Search
CPC ......... H04W 4/80; H04L 1/1887; H04L 1/187
See application file for complete search history.

(56) References Cited

U.S. PATENT DOCUMENTS

| 2009/0252143 | A1  | 10/2009 | Sridhara et al. |
| 2013/0064098 | A1  | 3/2013  | El-Saidny et al. |
| 2018/0175975 | A1* | 6/2018  | Um .................... H04L 1/1816 |

(Continued)

FOREIGN PATENT DOCUMENTS

| CN | 102405663 A | 4/2012 |
| CN | 10436 3080 A | 2/2015 |

OTHER PUBLICATIONS

LoRa Alliance, Inc, LoRaWAN Specification, 2015, 2016, Version 1.0.2.*

(Continued)

*Primary Examiner* — Gregory B Sefcheck
*Assistant Examiner* — Debebe A Asefa
(74) *Attorney, Agent, or Firm* — Harness, Dickey & Pierce, P.L.C.

(57) ABSTRACT

The network system includes a network node and an end device. The network node is required to send a confirmation to the end device upon reception of a data packet of a first type and is not required to send a confirmation to the end device upon reception of a data packet of a second type. The method includes transmitting, by the end device, data packets of the first type in accordance with a duty cycle that is smaller than or equal to the first upper limit indicated by a first command packet received from the network node. The application further relates to a network node and an end device for use in a network system.

19 Claims, 10 Drawing Sheets

(56) References Cited

U.S. PATENT DOCUMENTS

2019/0116593 A1* 4/2019 Sennoun .......... H04W 72/0453

OTHER PUBLICATIONS

LoRa Alliance, Inc, LoRaWAN Specification, 2015, 2016, Version 1.0.2 (Year: 2015).*
Notification Concerning Submission, Obtention or Transmittal of Priority Document (PCT/IB/304) for PCT International Application No. PCT/EP2017/080024 dated Dec. 4, 2017.
Notification of the Recording of a Change (PCT/IB/306) for PCT International Application No. PCT/EP2017/080024 dated Jun. 15, 2018.
PCT Request for PCT International Application No. PCT/EP2017/080024 dated Dec. 21, 2017.
Notification of Transmittal of the International Search Report and the Written Opinion of the International Searching Authority, or the Declaration (PCT/ISA/220) for PCT International Application PCT/EP2017/080024 dated Feb. 7, 2018.
International Search Report (PCT/ISA/210) for PCT International Application PCT/EP2017/080024 dated Feb. 7, 2018.
Written Opinion of the International Searching Authority (PCT/ISA/237) for PCT International Application PCT/EP2017/080024 dated Feb. 7, 2018.
CN Office Action for corresponding Chinese Patent Application No. 201780075194.3 dated Jun. 2, 2021.

* cited by examiner

| Size (bytes) | 1 | 1..M | 4 |
|---|---|---|---|
| PHYPayload | MHDR | MACPayload | MIC |

Fig. 7A

| Bit# | 7..5 | 4..2 | 1..0 |
|---|---|---|---|
| MHDR bits | MType | RFU | Major |

Fig. 7B

| Size (bytes) | 1 |
|---|---|
| DutyCycleReq Payload | DutyCyclePL |

Fig. 8A

| Bits | 7:4 | 3:0 |
|---|---|---|
| DutyCyclePL | RFU | MaxDCycle |

Fig. 8B

LOW POWER WIDE AREA NETWORK IMPROVED CONTROL OF PACKET RETRANSMISSION

CROSS-REFERENCE TO RELATED APPLICATIONS

This application is a national phase under 35 U.S.C. § 371 of PCT International Application No. PCT/EP2017/080024 which has an international filing date of Nov. 22, 2017, which claims priority to European Application No. 16306617.8, filed Dec. 5, 2016, the entire contents of each of which are hereby incorporated by reference.

TECHNICAL FIELD

This application relates to methods of data transmission in network systems and to network nodes and end devices for use in network systems. The application particularly relates to such methods, network nodes, and end devices in the context of wireless networks that operate in un-licensed frequency spectrum and/or that allow for un-slotted (e.g., ALOHA-type) transmission of data packets. The application is particularly applicable to Low Power Wide Area Networks (LPWANs).

BACKGROUND

LPWANs enable wireless transmission of data, such as sensor data for example, over a large distance, at a relatively low bitrate, and at a low power level, in order to limit (sensor) battery power consumption. Various LPWAN technologies operate in non-licensed spectrum, and use an ALOHA-type of communication, which means that transmission of data is un-slotted and is not coordinated between devices, so that network efficiency is limited to around 18%. LoRa/LoRaWAN (LoRaWAN: https://www.lora-alliance.org/What-Is-LoRa/Technology) is one of the mainstream technologies in this area. Within the LoRaWAN Media Access Control (MAC), communication takes place between end devices and a network node (e.g., comprising a network server) over two subnetworks: the wireless part between end device and gateway, and the backhaul part between gateway and network server. Since the wireless communication takes place in non-licensed spectrum, the Time-on-Air of both the end devices (e.g., sensors) and gateways is limited by regulation.

LPWANs such as LoRaWAN, for example, may provide two standard types of data transfer between end devices and network servers:
  Confirmed Data packets, in response to which the receiver must send a confirmation.
  Unconfirmed Data packets, for which no confirmation is needed.

After an end device has transmitted a packet (data packet), it may open one or more receive windows. For LoRaWAN, the end device opens two receive windows, RX1 and RX2, during which it can accept an incoming message from the network server. The duration and frequency of receive windows depends on the type of device (e.g., Class A, B or C for LoRaWAN), and is related to constraints in terms of power consumption.

One characteristic for operation in ALOHA mode is that packets from different devices may collide, and hence are lost. The higher the traffic density, the higher the probability that such loss of packets occurs. Moreover, operation in non-licensed spectrum results in competition with other traffic sources, using the same spectrum bands, which also may result in loss of packets.

Packet loss is typically dealt with by means of retransmission mechanisms. The LoRaWAN specification defines retransmission mechanisms both for confirmed and unconfirmed data packets:

For Unconfirmed Data packets, the network server can instruct an end device to transmit a packet NbTrans times (e.g., up to 15 times), in order to meet certain Quality of Service (QoS) objectives. In this case the packet (data packet) is sent NbTrans times, regardless of whether it is correctly received or not, unless the end device receives any packet during one of the receive windows RX1 or RX2. In case of receiving any packet during one of the receive windows, the retransmission sequence is aborted. This means that for unconfirmed data packets the network server has sufficient means to keep the volume of retransmissions under control, by appropriate traffic engineering measures.

On the other hand, in the case of confirmed data packets the end device can retransmit the packet without any limit, until a confirmation is received. The network server has no control over the number of retransmissions. Moreover, all end devices are allowed to send confirmed data packets, and the LoRaWAN specification states that the network server has to reply with a data packet with the acknowledgement (ACK) bit set, within one of the receive windows RX1 or RX2. All these ACK packets need to be relayed by the gateway over the wireless medium. This may result in conflicts with duty cycle limitations of the gateway, which is a serious concern for network operators.

While this problem is explained above with reference to LoRaWAN, it is likewise present in other network systems, in particular LPWANs, for example LPWANs operating in un-licensed spectrum and/or employing ALOHA-type transmission of data packets.

A solution that could be used by network operators is to recommend 'best practices' to application builders/providers. More concretely, they could recommend that end devices shall only send unconfirmed data packets, or limit the use of confirmed data packets to a minimum. However, the success of this approach depends entirely on the goodwill of application builders to comply with these guidelines.

Another solution that could be used is to capture agreements on 'restricted' use of confirmed data packets in Service Level Agreements (SLAs) between the network operator and the application providers. However, this requires that the network operator has the means to monitor the traffic, and to enforce the agreed behavior when needed; this is not the case with most current standards.

Thus, there is a need for improved means for network traffic control in network systems comprising a network node and an one or more end devices, in which the end devices can send confirmed data packets and unconfirmed data packets. There is a further need for a network node provided with improved network traffic control, and for an end device enabling improved network traffic control by the network node.

SUMMARY

In view of this need, the present document proposes a method of data transmission, a network node, and an end device, having the features of the respective independent claims.

An aspect of the disclosure relates to a method of data transmission in a network system (e.g., wireless network system, or network system comprising a wireless sub-network). The network may be a LPWAN. The network system may comprise a network node and an end device (e.g., one or more end devices). The network node may comprise a network server. The end device may comprise detectors and/or sensors. The end device may be able to transmit (e.g., may be configured to transmit, or may transmit) data packets of a first type and data packets of a second type to the network node. Transmission may use an un-licensed frequency spectrum or frequency band. Transmission may be performed in an un-slotted (e.g., ALOHA-type) manner. The network node may be required to send a confirmation to the end device upon reception of a data packet of the first type and may not be required to send a confirmation to the end device upon reception of a data packet of the second type. That is, the network node may operate under a network or communication standard, network or communication specification, or network or communication protocol, that requires the network node to send a confirmation to the end device upon reception of a data packet of the first type, but that does not require the network node to send a confirmation to the end device upon reception of a data packet of the second type. The end device may re-transmit a data packet of the first type until a confirmation is received from the network node. The method may comprise transmitting, by the network node, a first command packet including an indication of a first upper limit to the end device. The first upper limit may be an upper limit for a first duty cycle for transmission of the data packets of the first type by the end device. The first duty cycle may be said to be specific to the data packets of the first type. The indication of the first upper limit may comprise an indication of a value of the first upper limit. The method may yet further comprise transmitting, by the end device, the data packets of the first type in accordance with a duty cycle that is smaller than or equal to the first upper limit indicated by the first command packet. At the same time, the end device may transmit data packets of the second type without regard to the first upper limit. That is, transmission of data packets of the second type by the end device may not be limited by the first upper limit. The first upper limit on the duty cycle for transmission of data packets of the first type may be imposed on a per end device basis.

Configured as such, the proposed method allows the network operator to better control the volume (amount) of the first data packets (e.g., confirmed data packets in LoRaWAN), and their retransmissions, in the network, and thereby makes sure that the network node (and any gateways) can operate within the constraints of their duty cycle. By being able to influence the ratio of data packets of the first type and data packets of the second type (e.g., unconfirmed data packets in LoRaWAN) sent by end devices, the network operator can better control the overall volume of traffic in the network, especially in cases in which retransmission of the data packets of the second type is under full control of the network node (such as in a LoRaWAN, for example). This will contribute to lower packet loss rate and hence a better QoS. Since the first upper limit may be configured on a per end device basis, the proposed method enables a differentiation between different classes of end devices. This offers extended possibilities in the definition of SLAB.

In embodiments, the method may further comprise determining, by the network node, the first upper limit for the first duty cycle for transmission of the data packets of the first type by the end device. The determination may be performed on the basis of a network condition, e.g., network traffic, of the network system. The first upper limit may be determined on a per end device basis.

Accordingly, the amount of data packets for which a confirmation by the network node is required can be controlled so that the network node (and any gateways) can operate under the applicable duty cycle requirements, for example with an overall duty cycle smaller than an upper limit imposed by regulation. Thereby, it can be ensured that the network node can send a confirmation for any data packet of first type that is received, and indefinite retransmission by end devices waiting for a confirmation can be prevented. Doing so, network congestion due to excessive retransmission by end devices can be avoided. Notably, control of the amount of data packets for which a confirmation by the network node is required can be performed dynamically and can therefore account for changes in the overall network condition.

In embodiments, the first command packet may include the indication of the first upper limit as well as an indication that the first upper limit is to be applied by the end device to the duty cycle for transmission of the data packets of the first type (e.g., an indication that the first upper limit is to be used as an upper limit for the first duty cycle). The indication that the first upper limit is to be applied by the end device to the duty cycle for transmission of the data packets of the first type may be a bit flag (e.g., an indicator bit). A set indicator bit (e.g., set bit flag) may indicate that the first upper limit is to be applied to the duty cycle for transmission of the data packets of the first type.

In embodiments, the network system may be a LoraWAN (e.g., a network system according to the LoRaWAN specification, or a network system comprising a LoRaWAN). The data packets of the first type may be confirmed data packets and the data packets of the second type may be unconfirmed data packets. The first command packet may conform to a DutyCycleReq command. The DutyCyclePL field of the DutyCycleReq command (i.e., of the DutyCycleReq command embodying the first command packet) may include four bits indicating a value of an upper limit and one bit indicating that the upper limit is to be applied as the first upper limit. The first three bits (e.g., bits 7:5) of the DutyCyclePL field may be Reserved for Future Use (RFU) bits. The fourth bit (e.g., bit 4:4) may be the one bit (e.g., bit flag) indicating that the upper limit is to be applied as the first upper limit. The last four bits (e.g., bits 3:0) may indicate the value of the upper limit.

Configured as such, implementing the proposed method requires minimal modifications to existing end device operation and to protocol specification (such as in a LoRaWAN, for example). Namely, the first command packet uses an existing LoRaWAN message, preserves existing protocol fields, and only activates (part of a) RFU field. Hence, the proposed method can be easily implemented in existing network infrastructures.

In embodiments, the method may further comprise determining, by the network node, a second upper limit for a second duty cycle for transmission of data packets by the end device (e.g., for transmission of data packets by the end device regardless of type of the data packets). That is, the second duty cycle may be a duty cycle for transmitting packets of any one of the first type and the second type (e.g., regardless of whether transmitted packets are of first type or of second type). The second duty cycle may be said to be an overall or global duty cycle for all packets, or a duty cycle for transmission of a total, or aggregate, of all packets, including data packets of the first and second types and possibly other packets. The first upper limit may be smaller (lower) than the second upper limit. The determination may be performed on the basis of a network condition, e.g., network traffic. The method may further comprise transmitting, by the network node, a second command packet including an indication of the second upper limit to the end device. The indication of the second upper limit may comprise an indication of a value of the second upper limit. The method may yet further comprise transmitting, by the end device, packets of any one of the first type and the second type in accordance with a duty cycle that is smaller than or equal to the second upper limit indicated by the second command packet.

In embodiments, the network system may be a network system according to the LoRaWAN specification. That is, the network system may comprise a LoRaWAN. The data packets of the first type may be confirmed data packets and the data packets of the second type may be unconfirmed data packets. The first and second command packets may each conform to a DutyCycleReq command. The DutyCyclePL field of the DutyCycleReq command may include four bits indicating a value of an upper limit and one bit indicating whether the upper limit is to be applied as the first upper limit or the second upper limit. Depending on the value of the one bit, the respective DutyCycleReq command is a first command packet or a second command packet. The first three bits (e.g., bits 7:5) of the DutyCyclePL field may be RFU bits. The fourth bit (e.g., bit 4:4) may be the one bit (e.g., bit flag) indicating whether the upper limit is to be applied as the first upper limit (e.g., if the bit is set; in this case the DutyCycleReq command would be a first command packet) or the second upper limit (e.g., if the bit is not set; in this case the DutyCycleReq command would be a second command packet). The last four bits (e.g., bits 3:0) may indicate the value of the upper limit.

The processing of the method disclosed above can be implemented by a network node and/or an end device, as the skilled person will appreciate. It is understood that respective statements made above with respect to the method of data transmission apply likewise to such network node and end device.

Accordingly, another aspect of the disclosure relates to a network node for use in a network system (e.g., wireless network system, or network system comprising a wireless sub-network). The network may be a LPWAN. The network system may comprise the network node and an end device (e.g., one or more end devices). The network node may comprise a network server. The end device may comprise detectors and/or sensors. The end device may be able to transmit (e.g., may be configured to transmit, or may transmit) data packets of a first type and data packets of a second type to the network node. Transmission may use an un-licensed frequency spectrum or frequency band. Transmission may be performed in an un-slotted (e.g., ALOHA-type) manner. The network node may be required to send a confirmation to the end device upon reception of a data packet of the first type and may not be required to send a confirmation to the end device upon reception of a data packet of the second type. That is, the network node may operate under a network or communication standard, network or communication specification, or network or communication protocol, that requires the network node to send a confirmation to the end device upon reception of a data packet of the first type, but that does not require the network node to send a confirmation to the end device upon reception of a data packet of the second type. The end device may re-transmit a data packet of the first type until a confirmation is received from the network node. The network node may be further configured to transmit a first command packet including an indication of a first upper limit to the end device. The first upper limit may be an upper limit for a first duty cycle for transmission of the data packets of the first type by the end device. The first duty cycle may be said to be specific to the data packets of the first type. The indication of the first upper limit may comprise an indication of a value of the first upper limit. After receipt of the first command packet, the end device may be required to transmit the data packets of the first type in accordance with a duty cycle that is smaller than or equal to the first upper limit indicated by the first command packet. At the same time, the end device may be allowed to transmit data packets of the second type without regard to the first upper limit. That is, transmission of data packets of the second type by the end device may not be limited by the first upper limit. Additionally, the network node may be configured to send the confirmation to the end device upon receipt of a data packet of the first type. Further additionally, the network node may be configured to not send (e.g., to abstain from sending) the confirmation to the end device upon receipt of a data packet of the second type. The first upper limit on the duty cycle for transmission of data packets of the first type may be imposed on a per end device basis.

In embodiments, the network node may be configured to determine the first upper limit for a first duty cycle for transmission of the data packets of the first type by the end device. The determination may be performed on the basis of a network condition, e.g., network traffic, of the network system. The first upper limit may be determined on a per end device basis.

In embodiments, the first command packet may include the indication of the first upper limit as well as an indication that the first upper limit is to be applied by the end device to the duty cycle for transmission of the data packets of the first type (e.g., an indication that the first upper limit is to be used as an upper limit for the first duty cycle). The indication that the first upper limit is to be applied by the end device to the duty cycle for transmission of the data packets of the first type may be a bit flag (e.g., an indicator bit). A set indicator bit (e.g., set bit flag) may indicate that the first upper limit is to be applied to the duty cycle for transmission of the data packets of the first type.

In embodiments, the network system may be a network system according to the LoRaWAN specification. That is, the network system may comprise a LoRaWAN. The data packets of the first type may be confirmed data packets and the data packets of the second type may be unconfirmed data packets. The first command packet may conform to a DutyCycleReq command. The DutyCyclePL field of the DutyCycleReq command (i.e., of the DutyCycleReq command embodying the first command packet) may include four bits indicating a value of an upper limit and one bit indicating that the upper limit is to be applied as the first upper limit. The first three bits (e.g., bits 7:5) of the DutyCyclePL field may be RFU bits. The fourth bit (e.g., bit 4:4) may be the one bit (e.g., bit flag) indicating that the upper limit is to be applied as the first upper limit. The last four bits (e.g., bits 3:0) may indicate the value of the upper limit.

In embodiments, the network node may be further configured to determine a second upper limit for a second duty cycle for transmission of data packets by the end device (e.g., for transmission of data packets by the end device regardless of type of the data packets). That is, the second duty cycle may be a duty cycle for transmitting packets of any one of the first type and the second type (e.g., regardless of whether transmitted packets are of first type or of second type). The second duty cycle may be said to be an overall or global duty cycle for all packets, or a duty cycle for transmission of a total, or aggregate, of all packets, including data packets of the first and second types and possibly other packets. The first upper limit may be smaller (lower) than the second upper limit. The determination may be performed on the basis of a network condition, e.g., network traffic. The network node may be further configured to transmit a second command packet including an indication of the second upper limit to the end device. The indication of the second upper limit may comprise an indication of a value of the second upper limit. After receipt of the second command packet, the end device may be required to transmit packets of any one of the first type and the second type in accordance with a duty cycle that is smaller than or equal to the second upper limit indicated by the second command packet.

In embodiments, the network system may be a network system according to the LoRaWAN specification. That is, the network system may comprise a LoRaWAN. The data packets of the first type may be confirmed data packets and the data packets of the second type may be unconfirmed data packets. The first and second command packets may each conform to a DutyCycleReq command. The DutyCyclePL field of the DutyCycleReq command may include four bits indicating a value of an upper limit and one bit indicating whether the upper limit is to be applied as the first upper limit or the second upper limit. Depending on the value of the one bit, the respective DutyCycleReq command is a first command packet or a second command packet. The first three bits (e.g., bits 7:5) of the DutyCyclePL field may be RFU bits. The fourth bit (e.g., bit 4:4) may be the one bit (e.g., bit flag) indicating whether the upper limit is to be applied as the first upper limit (e.g., if the bit is set; in this case the DutyCycleReq command would be a first command packet) or the second upper limit (e.g., if the bit is not set; in this case the DutyCycleReq command would be a second command packet). The last four bits (e.g., bits 3:0) may indicate the value of the upper limit.

Another aspect of the disclosure relates to an end device for use in a network system (e.g., wireless network system, or network system comprising a wireless sub-network). The network may be a LPWAN. The network system may comprise a network node and the end device. The network node may comprise a network server. The end device may comprise detectors and/or sensors. The end device may be configured to transmit sensed values and/or detected values (in general, sampled data values) to the network node. The end device may be configured to transmit data packets of a first type and data packets of a second type to the network node. Transmission may use an un-licensed frequency spectrum or frequency band. Transmission may be performed in an un-slotted (e.g., ALOHA-type) manner. Data packets of the first type may be data packets for which the network node is required to send a confirmation upon reception and the data packets of the second type may be data packets for which the network node is not required to send a confirmation upon reception. That is, the network node may operate under a network or communication standard, network or communication specification, or network or communication protocol, that requires the network node to send a confirmation to the end device upon reception of a data packet of the first type, but that does not require the network node to send a confirmation to the end device upon reception of a data packet of the second type. The end device may re-transmit a data packet of the first type until a confirmation is received from the network node. The end device may be further configured to receive a first command packet from the network node. The first command packet may include an indication of a first upper limit for a first duty cycle for transmission of the data packets of the first type by the end device. The first duty cycle may be said to be specific to the data packets of the first type. The indication of the first upper limit may comprise an indication of a value of the first upper limit. The end device may be yet further configured to transmit the data packets of the first type in accordance with a duty cycle that is smaller than or equal to the first upper limit indicated by the first command packet. At the same time, the end device may transmit data packets of the second type without regard to the first upper limit. That is, transmission of data packets of the second type by the end device may not be limited by the first upper limit.

In embodiments, the first command packet may include the indication of the first upper limit as well as an indication that the first upper limit is to be applied by the end device to the duty cycle for transmission of the data packets of the first type (e.g., an indication that the first upper limit is to be used as an upper limit for the first duty cycle). The indication that the first upper limit is to be applied by the end device to the duty cycle for transmission of the data packets of the first type may be a bit flag (e.g., an indicator bit). A set indicator bit (e.g., set bit flag) may indicate that the first upper limit is to be applied to the duty cycle for transmission of the data packets of the first type.

In embodiments, the network system may be a network system according to the LoRaWAN specification. That is, the network system may comprise a LoRaWAN. The data packets of the first type may be confirmed data packets and the data packets of the second type may be unconfirmed data packets. The first command packet may conform to a DutyCycleReq command. The DutyCyclePL field of the DutyCycleReq command (i.e., of the DutyCycleReq command embodying the first command packet) may include four bits indicating a value of an upper limit and one bit indicating that the upper limit is to be applied as the first upper limit. The first three bits (e.g., bits 7:5) of the DutyCyclePL field may be RFU bits. The fourth bit (e.g., bit 4:4) may be the one bit (e.g., bit flag) indicating that the upper limit is to be applied as the first upper limit. The last four bits (e.g., bits 3:0) may indicate the value of the upper limit.

In embodiments, the end device may be further configured to receive a second command packet from the network node. The second command packet may include an indication of a second upper limit for a second duty cycle for transmission of data packets by the end device (e.g., for transmission of data packets by the end device regardless of type of the data packets). That is, the second duty cycle may be a duty cycle for transmitting packets of any one of the first type and the second type (e.g., regardless of whether transmitted packets are of first type or of second type). The second duty cycle may be said to be an overall or global duty cycle for all packets, or a duty cycle for transmission of a total, or aggregate, of all packets, including data packets of the first and second types and possibly other packets. The first upper limit may be smaller (lower) than the second upper limit. The indication of the second upper limit may comprise an indication of a value of the second upper limit. The end device may be further configured to transmit packets of any one of the first type and the second type in accordance with a duty cycle that is smaller than or equal to the second upper limit indicated by the second command packet.

In embodiments, the network system may be a network system according to the LoRaWAN specification. That is, the network system may comprise a LoRaWAN. The data packets of the first type may be confirmed data packets and the data packets of the second type may be unconfirmed data packets. The first and second command packets may each conform to a DutyCycleReq command. The DutyCyclePL field of the DutyCycleReq command may include four bits indicating a value of an upper limit and one bit indicating whether the upper limit is to be applied as the first upper limit or the second upper limit. Depending on the value of the one bit, the respective DutyCycleReq command is a first command packet or a second command packet. The first three bits (e.g., bits 7:5) of the DutyCyclePL field may be RFU bits. The fourth bit (e.g., bit 4:4) may be the one bit (e.g., bit flag) indicating whether the upper limit is to be applied as the first upper limit (e.g., if the bit is set; in this case the DutyCycleReq command would be a first command packet) or the second upper limit (e.g., if the bit is not set; in this case the DutyCycleReq command would be a second command packet). The last four bits (e.g., bits 3:0) may indicate the value of the upper limit.

It will be appreciated that method steps and apparatus features may be interchanged in many ways. In particular, the details of the disclosed method can be implemented by a network node and/or an end device, as the skilled person will appreciate.

BRIEF DESCRIPTION OF THE FIGURES

Example embodiments of the disclosure are explained below with reference to the accompanying drawings, wherein FIG. 1 schematically illustrates an example of a network system;

FIGS. 6A, 6B, 6C, 6D and FIGS. 7A, 7B schematically illustrate details of MAC message formats in LoRaWAN;

FIGS. 8A, 8B schematically illustrate details of the Duty-CycleReq command of LoRaWAN;

DETAILED DESCRIPTION

Figure 1:
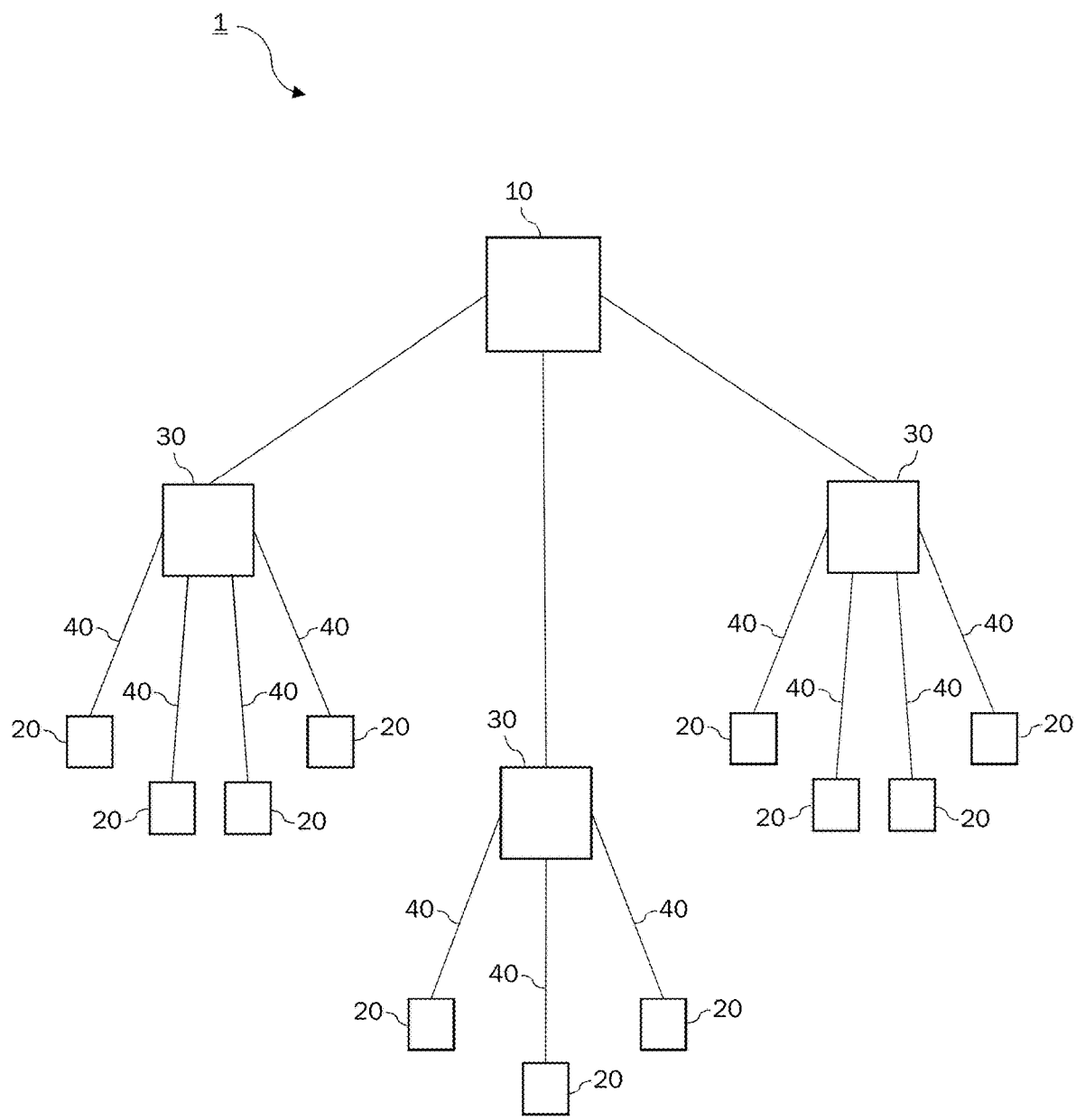

FIG. 1 schematically illustrates an example of a network (network system) 1 to which embodiments of the disclosure may be applicable. The network may be a LPWAN. The network system 1 comprises a network node 10 (e.g., comprising a network server) and one or more end devices 20 (e.g., comprising one or more sensors and/or detectors). The end devices 20 may communicate wirelessly over a wireless connection 40 with a respective gateway 30. The gateways 30 in turn may communicate with the network node 10 by wired or wireless communication (e.g., a backhaul connection). Notably, the one or more end devices 20 may also communicate directly and wirelessly with the network node 10, in which case the gateways 30 could be omitted. In general, the one or more end devices 20 may be said to communicate wirelessly with the network node 10 (either directly, or via respective gateways 30). Thus, the network system 1 may generally said to be a wireless network system, or network system comprising a wireless sub-network. At least part of the wireless communication between the end devices 20 and the network node 10 may be performed in un-licensed frequency spectrum and/or in an ALOHA-type manner (e.g., in an un-synchronized and/or un-slotted manner). For example, wireless communication between the end devices 20 and respective gateways 30 may be performed in un-licensed frequency spectrum and/or in an ALOHA-type manner (e.g., in an un-synchronized and/or un-slotted manner). For simplicity, also communication between the end devices 20 and the network node 10 via respective gateways 30 for which communication between the end devices 20 and the gateways 30 is performed in un-licensed frequency spectrum and/or in an ALOHA-type manner (e.g., in an un-synchronized and/or un-slotted manner) will be referred to as wireless communication between the end devices 20 and the network node 10 that is performed in un-licensed frequency spectrum and/or in an ALOHA-type manner (e.g., in an un-synchronized and/or un-slotted manner) throughout this document.

Typically, standards for network systems operating in unlicensed spectrum (such as LoRaWAN, for example) define data packets for which a confirmation by the network server is necessary, and data packets for which a confirmation by the network server is not required. The former are referred to as data packets of the first type throughout the disclosure. The confirmed data packets of LoRaWAN are an example of data packets of the first type. The latter are referred to as data packets of the second type throughout the disclosure. The unconfirmed data packets of LoRaWAN are an example of data packets of the second type. The one or more end devices 20 in FIG. 1 may transmit packets of the first type and packets of the second type to the network node 10 (e.g., via respective gateways 30). The one or more end devices 20 may retransmit data packets of the first type indefinitely (i.e., with infinitely many retransmissions of a given packet of the first type), unless (e.g., until) a confirmation (e.g., an ACK packet) is received from the network node 10 (e.g., via respective gateways 30). This may lead to a significant increase of network traffic and packet collisions, and hence a significant increase in packet loss rate. On the other hand, the end devices 20 may re-transmit the data packets of the second type for a predetermined (and configurable) number of times.

Broadly speaking, the present disclosure addresses the above issue and enables to provide the network server with improved means to keep the volume of data packets of the first type (e.g., confirmed data packets), and hence the volume of acknowledgements from the network server, under control.

For this purpose, the duty cycle principle employed by such standards is extended as follows: On top of the overall duty cycle concept as defined by regulation (and e.g., by LoRaWAN), which is to be applied to the total volume of data packets transmitted by an end device, an additional first duty cycle for data packets of the first type (e.g., confirmed data packets) is introduced, which is lower than the overall duty cycle. The duty cycle for transmission of data packets regardless of whether the data packets are of the first type or the second type (e.g., overall duty cycle, global duty cycle, or total duty cycle) is referred to as a second duty cycle. Upper limits on the first and second duty cycles are referred to as first and second upper limits, respectively.

Here and in the remainder of this document, the term duty cycle is intended to indicate, for a given device, a ratio between a time on air (a period of time during which transmission occurs) and a total period of time, for a given period of time. That is, the duty cycle is intended to indicate, for a given device, a fraction of time during which transmission occurs. For example, the total period of time may be the time between transmission of a data packet and transmission of the next data packet. An example for determining a period of time during which transmission may not be performed on the basis of a given duty cycle will be given further below.

The volume (amount) of data packets of the first type (e.g., confirmed data packets) transmitted by an end device 20 shall be limited by a specific upper limit for the first duty cycle. This first upper limit may be a specific Confirmed Duty Cycle (CDC) for the example of LoRaWAN. The first upper limit (e.g., CDC) may be configurable by the network server on a per end device basis. The first upper limit can be used either on a permanent basis (e.g., in the context of an SLA) or on a temporary basis (e.g., to deal with network issues). Examples for methods for configuring the first upper limit will be described below with reference to FIG. 2 and FIG. 3.

Figure 2:
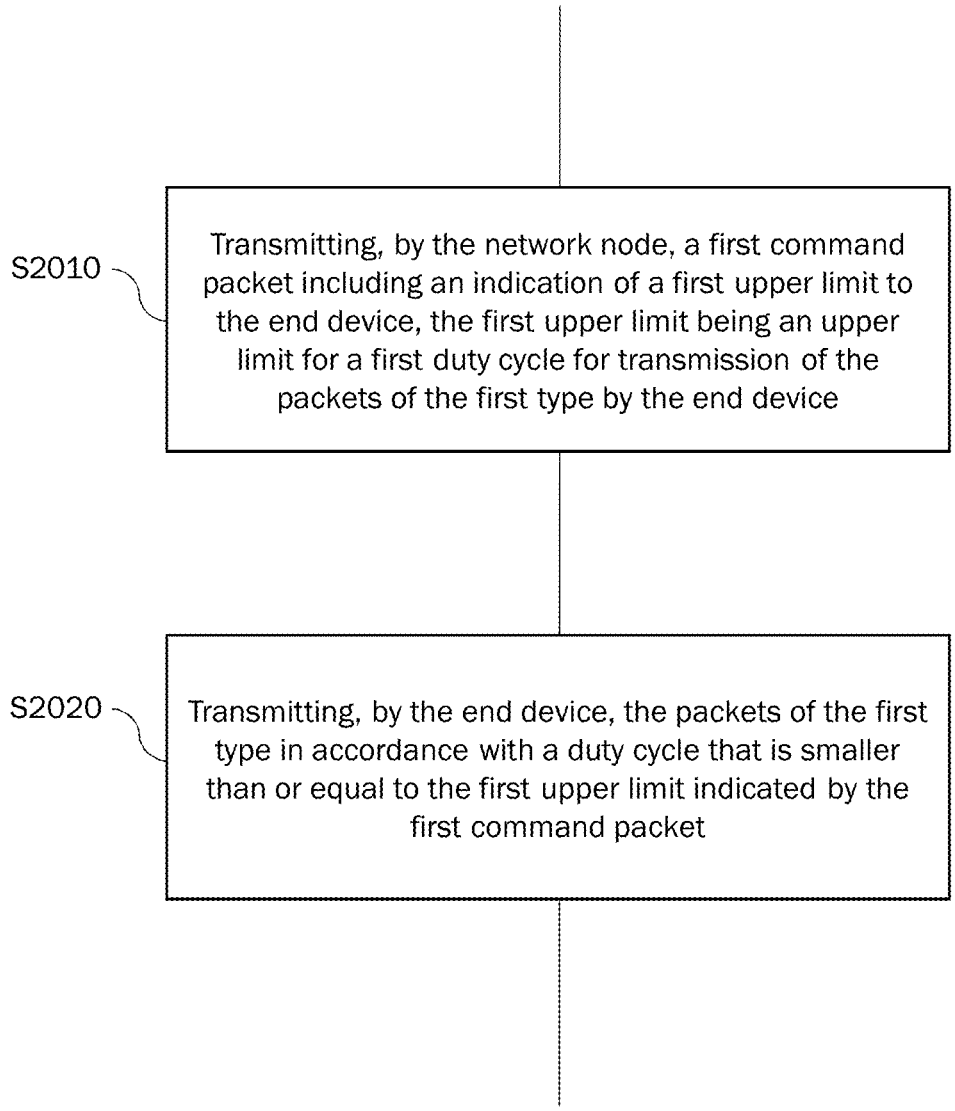
FIG. 2 is a flowchart illustrating an example of a method according to embodiments of the disclosure.

An example of a method according to embodiments of the disclosure is illustrated in the flowchart of FIG. 2. At step S2010, the network node 10 transmits a first command packet including an indication (e.g., value) of a first upper limit to an end device 20 among the one or more end devices 20. The first command packet may further include an indication that the first upper limit is to be applied by the end device 20 to the duty cycle for transmission of the data packets of the first type. The network node 10 may transmit the first command packet directly or via a gateway 30 of the network system 1. The first upper limit is an upper limit for a first duty cycle for transmission of the data packets of the first type by the end device 20. The first duty cycle may be said to be specific to the data packets of the first type. By transmitting first command packets to different end devices 20, the first upper limit on the duty cycle for transmission of data packets of the first type may be imposed on a per end device basis. That is, different end devices 20 among the one or more end devices 20 may receive (and operate under) different first upper limits. At step S2020, the end device 20 transmits (e.g., commences to transmit) the data packets of the first type in accordance with a duty cycle that is smaller than or equal to the first upper limit indicated by the first command packet. That is, after receipt of the first command packet from the network node 10, the end device 20 performs transmission of data packets of the first type so as to meet the duty cycle requirement imposed by the first upper limit. The end device 20 transmits the data packets of the first type to the network node 10, either directly or via a gateway 30 of the network system 1. At the same time, the end device may transmit data packets of the second type without regard to the first upper limit. That is, transmission of data packets of the second type by the end device may not be limited by the first upper limit.

In the example method of FIG. 2, the first upper limit that is indicated to a given end device 20 by means of the first command packet may be determined on the basis of an SLA for the given end device 20, for example. Such first upper limits that are determined based on SLAs may be constant overtime. Alternatively, the first upper limit(s) may be determined by the network node 10 dynamically. For example, the first upper limit(s) may be determined based on a network condition (e.g., network traffic) of the network system 1.

Figure 3:
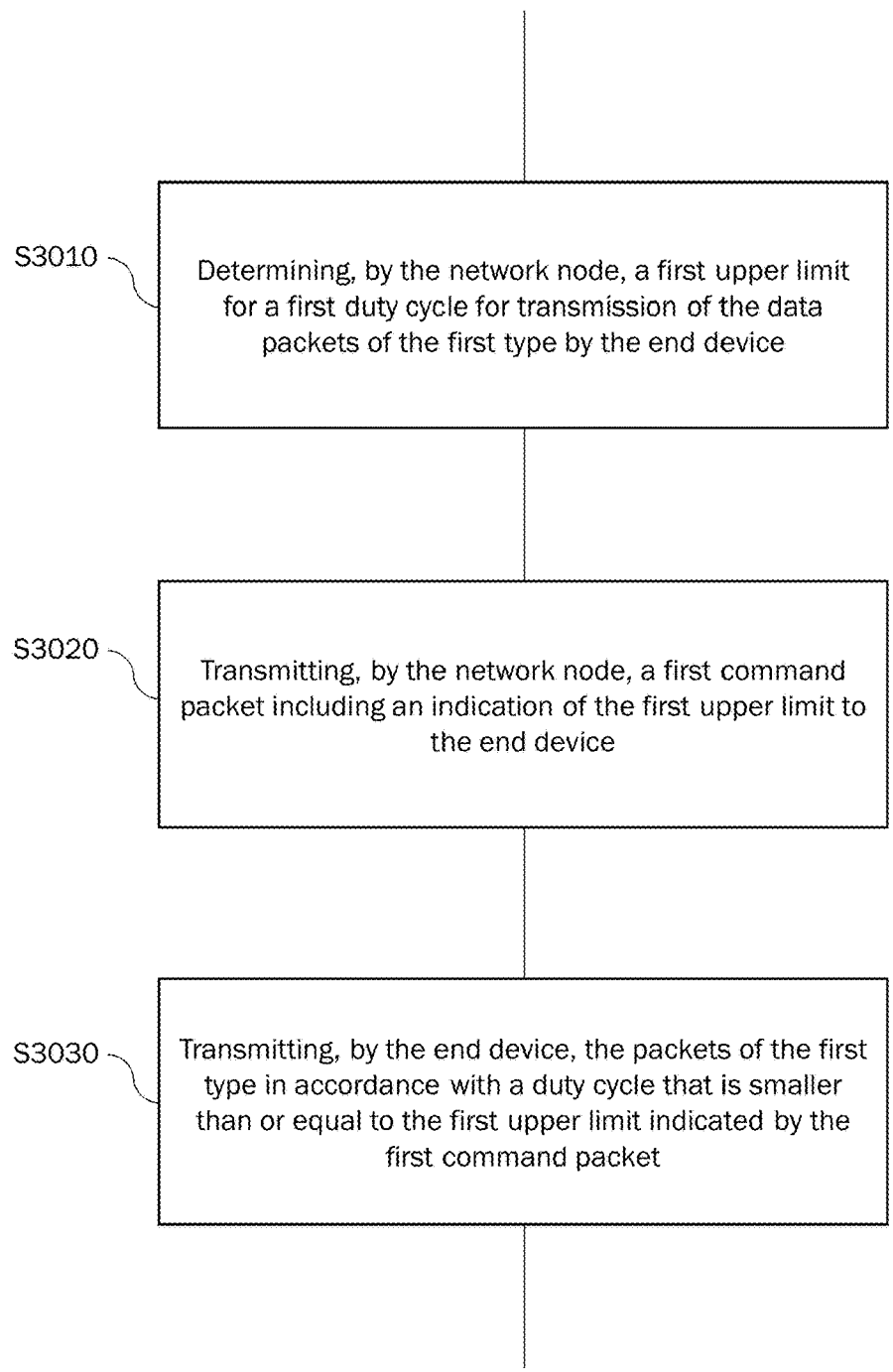
FIG. 3 is a flowchart illustrating an example of another method according to embodiments of the disclosure.

An example of such a method according to embodiments of the disclosure is illustrated in the flowchart of FIG. 3. At step S3010, the network node 10 determines a first upper limit for a first duty cycle for transmission of the data packets of the first type by an end device 20. This determination may be performed on the basis of a network condition of the network system. For example, the determination may be performed on the basis of a network traffic (e.g., present or projected) of the network system 1. Alternatively or additionally, the determination may be performed on the basis of an overall number of packets of the first type that the network node 10 receives per unit of time (e.g., a rate of receipt of packets of the first type), and/or a number of confirmations that the network node 10 sends per unit of time unit (e.g., a rate of transmission of confirmations). Accordingly, the first upper limit for the end device 20 may be determined continuously and/or periodically by the network node 10. The first upper limit may be determined dynamically. At step S3020, the network node 10 transmits a first command packet including an indication (e.g., value) of the determined first upper limit to an end device 20 among the one or more end devices 20. Otherwise, step S3020 corresponds to step S2010 described above. At step S3030, the end device 20 transmits (e.g., commences to transmit) the data packets of the first type in accordance with a duty cycle that is smaller than or equal to the first upper limit indicated by the first command packet. Otherwise, step S3030 corresponds to step S2020 described above. In FIG. 2 and FIG. 3, the first upper limit on the duty cycle for transmission of data packets of the first type may be determined and/or imposed on a per end device basis. That is, different first upper limits may be determined for and/or imposed on different end devices 20.

Figure 4:
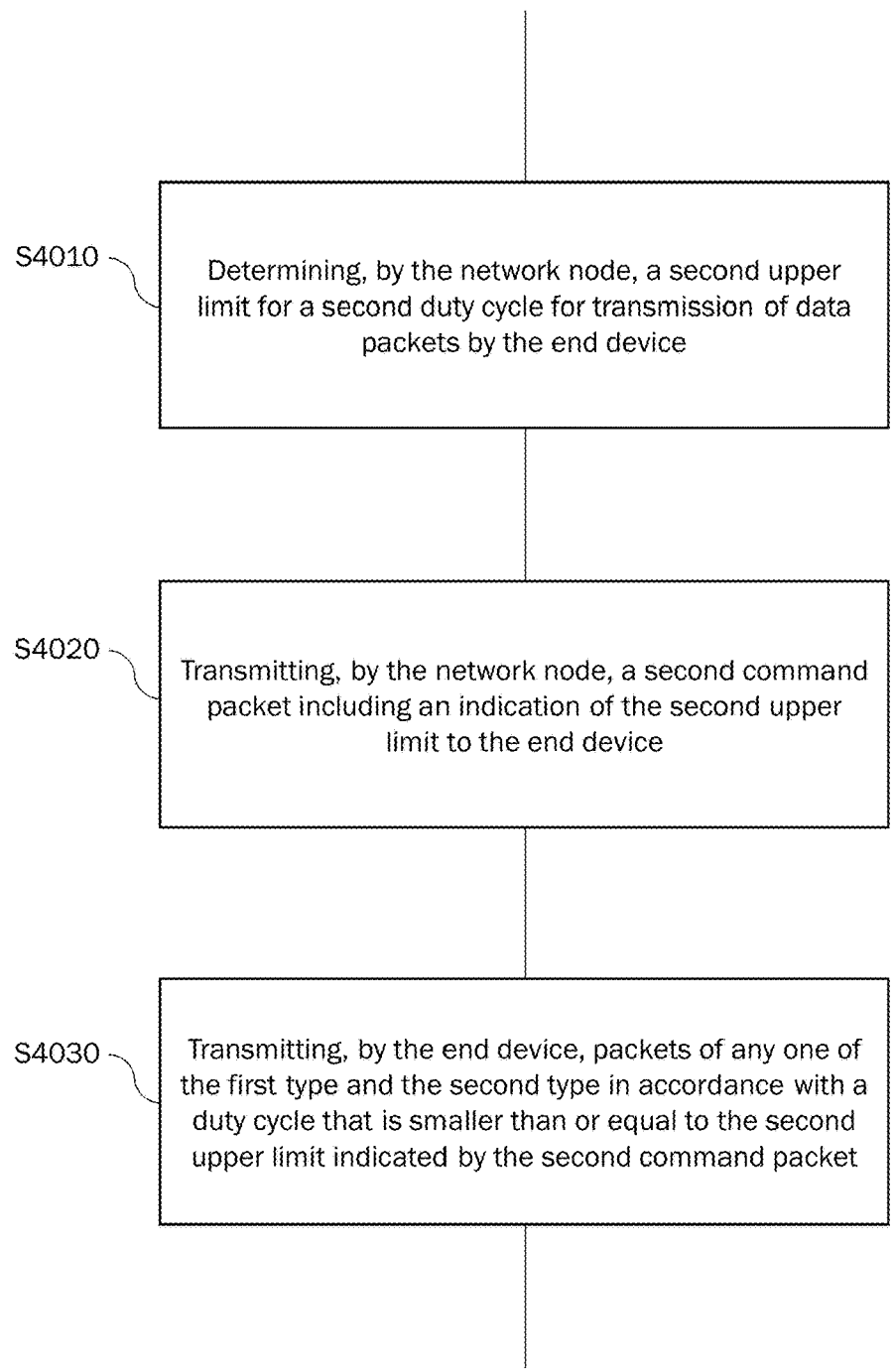
FIG. 4 is a flowchart illustrating an example of additional steps of the methods of FIG. 2 and FIG. 3.

An example of additional steps that may be performed in the context of either one of the methods of FIG. 2 and FIG. 3 is illustrated in the flowchart of FIG. 4. According to these additional steps, an overall duty cycle for data packet transmission by the end device(s) 20 may be determined and imposed. A second upper limit on the overall duty cycle may be lower than an upper limit set by regulations. The second upper limit may be imposed in order to control overall network traffic.

At step S4010, the network node 10 determines a second upper limit for a second duty cycle for transmission of data packets by the end device 20. The second duty cycle is a duty cycle for transmitting packets of any one of the first type and the second type (e.g., regardless of whether transmitted packets are of first type or of second type). Thus, The second duty cycle may be said to be an overall or global duty cycle for all packets, or a duty cycle for transmission of a total, or aggregate, of all packets, including data packets of the first and second types and possibly other packets. The second upper limit typically is larger than (or equal to, in extremal cases) the first upper limit. The determination of the second upper limit may be performed on the basis of a network condition of the network system 1. For example, the second upper limit may be determined on the basis of a network traffic (e.g., present or projected) of the network system 1. At step S4020, the network node 10 transmits a second command packet including an indication (e.g., value) of the second upper limit to the end device 20. The second command packet may further include an indication that the second upper limit is to be applied by the end device 20 to the duty cycle for transmission of the data packets of any one of the first type and the second type. The network node 10 may transmit the second command packet directly or via a gateway 30 of the network system 1. By transmitting second command packets to different end devices 20, the second upper limit on the duty cycle for transmission of data packets may be determined and imposed on a per end device basis. That is, different end devices 20 among the one or more end devices 20 may receive (and operate under) different second upper limits. At step S4030, the end device 20 transmits packets of any one of the first type and the second type in accordance with a duty cycle that is smaller than or equal to the second upper limit indicated by the second command packet. That is, after receipt of the second command packet from the network node 10, the end device 20 performs transmission of data packets of the first and second types so as to meet the duty cycle requirement imposed by the second upper limit. In general, the end device 20 transmits packets of any type in accordance with a duty cycle that is smaller than or equal to the second upper limit (typically, the data packets of the first and second types can be assumed to account for the most part of total transmission by the end device 20). In other words, a total of the packet transmission (e.g., data packets of the first and second types and possibly other packets) by the end device is limited by the second upper limit. Therein, it is understood that transmission of data packets of the first type still needs to meet the restriction imposed by the first upper limit. The end device 20 transmits the data packets of the first and second types (and possibly any further packets) to the network node 10, either directly or via a gateway 30 of the network system 1.

A network node 10 according to embodiments of the disclosure may be configured to perform any or all of steps S2010, S3010, S3020, S4010, and S4020 described above. The network node 10 may comprise a network server configured to perform any or all of steps S2010, S3010, S3020, S4010, and S4020 described above. To this end, the network node 10 or network server may comprise means to determine the first upper limit and/or the second upper limit (e.g., a processing unit or processor), as well as means for transmitting the first command packets and/or the second command packets (e.g., a transmitting unit, or transmitter). The network node 10 or network server may further comprise means for receiving the data packets of the first type and/or the data packets of the second type (e.g., a receiving unit, or receiver). The means for transmitting may be further configured to transmit confirmations responsive to received data packets of the first type. In embodiments, the network node 10 or network server may comprise a processor and a memory with instructions stored thereon, the instructions being executable by the processor. The processor may be configured to determine the first upper limit and/or the second upper limit. The processor may be further configured to instruct a transmitter coupled to the processor to transmit the first command packets and/or the second command packets. The processor may be yet further configured to receive the data packets of the first type and/or the data packets of the second type from a receiver coupled to the processor.

An end device 20 according to embodiments of the disclosure may be configured to perform any or all of steps S2020, S3030, and S4030 described above. To this end, the end device may comprise means for receiving the first command packets and/or the second command packets (e.g., a receiving unit, or receiver). The end device 20 may further comprise means for transmitting the data packets of the first type and/or the data packets of the second type (e.g., a transmitting unit, or transmitter) in accordance with applicable duty cycles/upper limits. The means for receiving may be further configured to receive confirmations sent by the network node 10 in response to data packets of the first type. The end device 20 may comprise one or more sensors and/or detectors. In embodiments, the end device 20 may comprise a processor and a memory with instructions stored thereon, the instructions being executable by the processor. The processor may be configured to receive the first command packets and/or the second command packets from a receiver coupled to the processor, and further to receive the confirmations sent by the network node 10 from the receiver. The processor may be further configured to instruct a transmitter coupled to the processor to transmit the data packets of the first type and/or the data packets of the second type in accordance with applicable duty cycles/upper limits.

As indicated above, by the method according to embodiments of the disclosure, the network operator gets a means to enforce limited usage of data packets of the first type (e.g., confirmed data packets) by end devices, by configuring the first upper limit (e.g., CDC) substantially lower than the overall duty cycle as imposed by regulation.

In an example scenario, a gateway (or network node) supports 5000 end devices (end nodes), sending on average 20% of their data as data packets of the first type (e.g., confirmed data packets). Supposing that each end device sends one packet over a period of time T, this implies 5000 packets per period of time T, of which woo data packets are data packets of the first type. When the ratio of data packets of the first type were limited to 5% for 50% of the end devices (e.g., by reducing their first upper limits), the amount of data packets of the first type would be reduced to a maximum of 625.

Thus, methods according to embodiments of the disclosure ensure that the involved gateways (or network nodes) can comply better with the applicable duty cycle constraints. In the example scenario described above, the number of confirmations (e.g., ACKs) that must be sent by the network node is reduced by nearly 40%. Moreover, the method according to the disclosure creates additional means to differentiate behavior between categories of end devices, and hence enlarges the possibilities to define tailored SLAs with application providers. Yet further, the method according to the disclosure allows shifting end devices to extended use of data packets of the second type (e.g., unconfirmed data packets), for which the retransmission mechanism can be kept much better under control of the network node by appropriate traffic engineering measures (as explained elsewhere in the disclosure, for example).

A specific network system to which example embodiments of the disclosure can be applied will now be described with reference to the LoRaWAN network protocol (for example according to version 1.0, version 1.0.1, or version 1.0.2 of the LoRaWAN specification). LoRa™ is a wireless modulation for long-range low-power low-data-rate applications developed by Semtech.

The LoRaWAN™ network protocol is optimized for battery-powered end devices that may be either mobile or mounted at a fixed location. LoRaWAN networks typically are laid out in a star-of-stars topology in which gateways (gateways are also known as concentrators or base stations) relay messages between end devices (end devices are also known as motes) and a central network server at the back-end. Gateways may be connected to the network server via standard IP connections while end devices use single-hop LoRa™ or Frequency-Shift Keying (FSK) communication to one or many gateways. All communication is generally bi-directional, although uplink communication from an end device to the network server is expected to be the predominant traffic.

Communication between end devices and gateways is spread out on different frequency channels and data rates. The selection of the data rate may be a trade-off between communication range and message duration, communications with different data rates do not interfere with each other. LoRa data rates may range from 0.3 kbps to 50 kbps. To maximize both battery life of the end devices and overall network capacity, the LoRa network infrastructure can manage the data rate and RF output for each end device individually by means of an Adaptive Data Rate (ADR) scheme.

End devices may transmit on any channel available at any time, using any available data rate, as long as the following rules are respected:

The end device changes channel in a pseudo-random fashion for every transmission. The resulting frequency diversity makes the system more robust to interferences.

The end device respects the maximum transmit duty cycle relative to the sub-band used and local regulations.

The end device respects the maximum transmit duration (or dwell time) relative to the sub-band used and local regulations.

Maximum transmit duty-cycle (e.g., an upper limit on the transmit duty cycle) and dwell time per sub-band may be region specific.

Support for intermediate elements (e.g., repeaters) is not described in this document, however payload restrictions for encapsulation overhead are included in the LoRaWAN specification (e.g., version 1.0, version 1.0.1, or version 1.0.2 of the LoRaWAN specification, which are herewith incorporated in their entirety). A repeater is defined as using LoRaWAN as its backhaul mechanism.

In the present description of LoRaWAN, MAC commands are written LinkCheckReq, bits and bit fields are written FRMPayload, constants are written RECEIVE_DELAY1, variables are written N. Moreover, the octet order for all multi-octet fields is little endian, EUI are 8 bytes multi-octet fields and are transmitted as little endian, and by default, RFU bits are set to zero.

Next, classes of LoRaWAN end devices (LoRaWAN Classes) will be described. All LoRaWAN devices implement at least the Class A functionality as described in this document. In addition they may implement options named Class B, Class C as also described in this document or others to be defined. In all cases, they must remain compatible with Class A.

Figure 5:
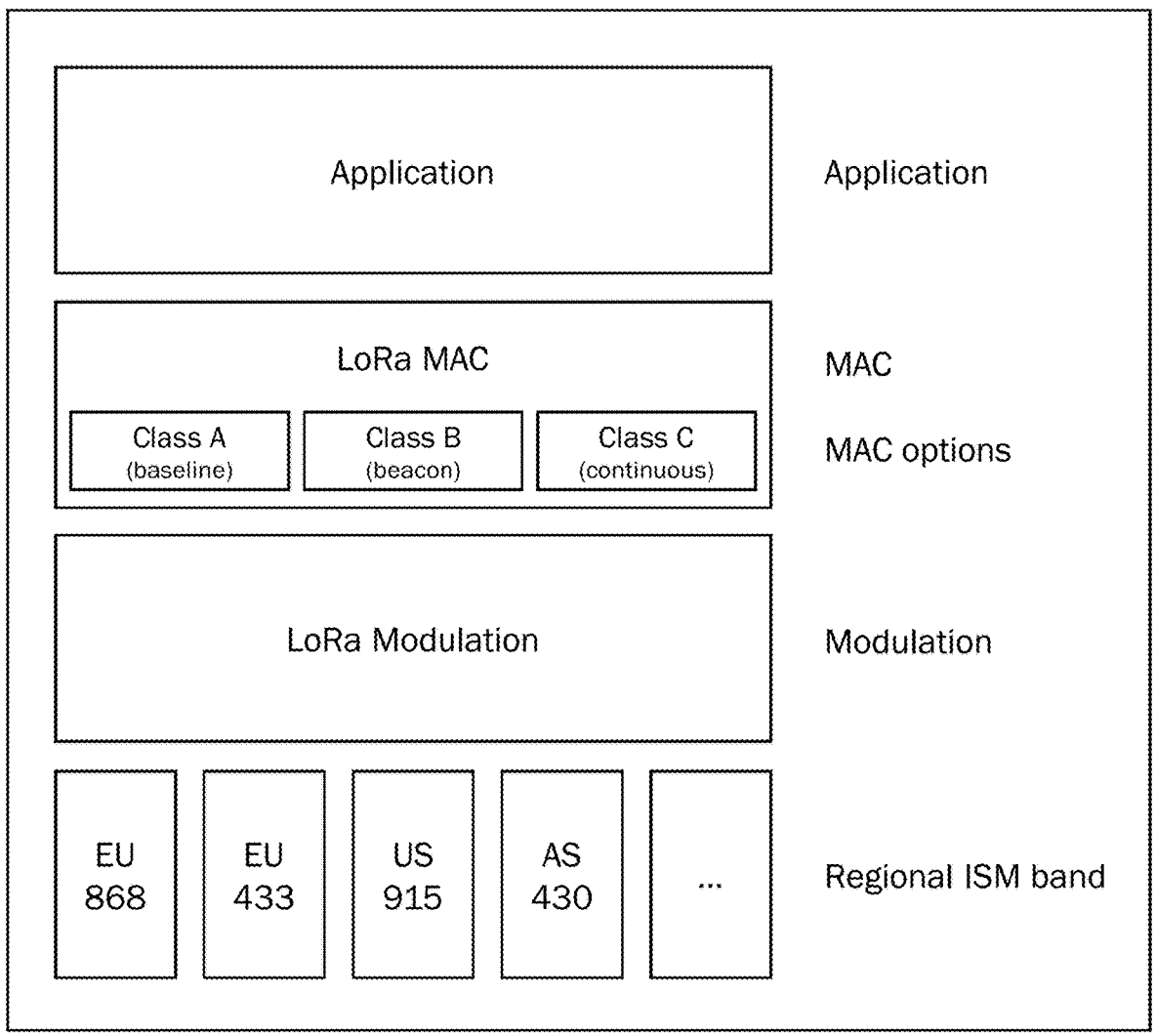
FIG. 5 schematically illustrates an overview over classes of end devices in a LoRaWAN.

Devices implementing more than Class A are generally named "higher Class end devices" in this document. A LoRa network distinguishes between a basic LoRaWAN (named Class A) and optional features (Class B, Class C . . . ). FIG. 5 schematically illustrates an overview over LoRaWAN classes A, B, and C. These classes are defined as follows:

Bi-directional end devices (Class A): End-devices of Class A allow for bi-directional communications whereby each end device's uplink transmission is followed by two short downlink receive windows. The transmission slot scheduled by the end device is based on its own communication needs with a small variation based on a random time basis (ALOHA-type of protocol). This Class A operation is the lowest power end device system for applications that only require downlink communication from the server shortly after the end device has sent an uplink transmission. Downlink communications from the server at any other time will have to wait until the next scheduled uplink.

Bi-directional end devices with scheduled receive slots (Class B): End-devices of Class B allow for more receive slots. In addition to the Class A random receive windows, Class B devices open extra receive windows at scheduled times. In order for the End-device to open it receive window at the scheduled time it receives a time synchronized Beacon from the gateway. This allows the server to know when the end device is listening.

Bi-directional end devices with maximal receive slots (Class C): End-devices of Class C have nearly continuously open receive windows, only closed when transmitting. Class C end device will use more power to operate than Class A or Class B but they offer the lowest latency for server to end device communication.

Figure 6A:
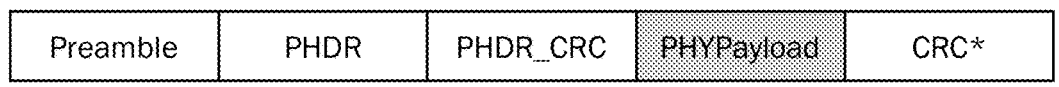
Figure 6B:
Figure 6C:
Figure 6D:
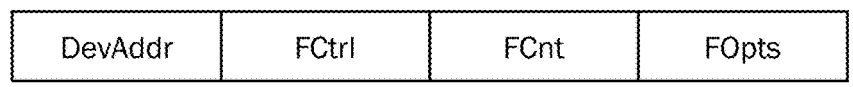

Next, MAC message formats in LoRaWAN will be described. All LoRa uplink and downlink messages carry a PHY payload (Payload) starting with a single-octet MAC header (MHDR), followed by a MAC payload (MACPayload), and ending with a 4-octet message integrity code (MIC). Details of MAC message formats are illustrated in FIG. 6 and FIG. 7. FIG. 6A schematically illustrates a radio PHY structure. Notably, CRC* in this figure is only available on uplink messages. FIG. 6B schematically illustrates a PHY payload structure. FIG. 6C schematically illustrates a MAC payload structure. FIG. 6D schematically illustrates a frame header structure.

FIG. 7A schematically illustrates the MAC Layer (PHY-Payload). The maximum length (M) of the MACPayload field may be region specific. FIG. 7B schematically illustrates the MAC header (MHDR field). The MAC header specifies the message type (MType) and according to which major version (Major) of the frame format of the LoRaWAN layer specification the frame has been encoded.

Next, the message types in LoRaWAN (indicated by the MType bit field) will be described. The LoRaWAN distinguishes between six different MAC message types: join request, join accept, unconfirmed data up/down, and confirmed data up/down. These message types are summarized in Table 1.

TABLE 1

| MAC message types | |
| --- | --- |
| MType | Description |
| 000 | Join Request |
| 001 | Join Accept |
| 010 | Unconfirmed Data Up |
| 011 | Unconfirmed Data Down |
| 100 | Confirmed Data Up |
| 101 | Confirmed Data Down |
| 110 | RFU |
| 111 | Proprietary |

The join-request and join-accept messages are used by the over-the-air activation procedure of LoRaWAN.

Data messages are used to transfer both MAC commands and application data, which can be combined together in a single message. A confirmed-data message has to be acknowledged by the receiver, whereas an unconfirmed-data message does not require an acknowledgment. Proprietary messages can be used to implement non-standard message formats that are not interoperable with standard messages but must only be used among devices that have a common understanding of the proprietary extensions. Message integrity is ensured in different ways for different message types.

Next, MAC commands (MAC command packets) in LoRaWAN will be described. For network administration, a set of MAC commands may be exchanged exclusively between the network server and the MAC layer on an end device. MAC layer commands are never visible to the application or the application server or the application running on the end device. A single data frame can contain any sequence of MAC commands, either piggybacked in the FOpts field or, when sent as a separate data frame, in the FRMPayload field with the FPort field being set to 0. Piggybacked MAC commands are always sent without encryption and must not exceed 15 octets. MAC commands sent as FRM Payload are always encrypted and must not exceed the maximum FRMPayload length. MAC commands whose content shall not be disclosed to an eavesdropper must be sent in the FRMPayload of a separate data message.

specified only in a version of the LoRaWAN specification newer than that implemented.

Any values adjusted by the network server (e.g., RX2, new or adjusted channels definitions) remain only valid until the next join of the end device. Therefore after each successful join procedure the end device uses the default parameters again and it is up to the network server to re-adjust the values again as needed.

Next, the end device transmit duty cycle in LoRaWAN will be described. The DutyCycleReq command is used by the network coordinator to limit the maximum aggregated transmit duty cycle of an end device. The aggregated transmit duty cycle corresponds to the transmit duty cycle over all sub-bands. FIG. 8A illustrates the DutyCycleReq Payload. FIG. 8B schematically illustrates the DutyCyclePL field of the DutyCycleReq Payload.

TABLE 2

MAC commands

| CID | Command | Transmitted by End device | Transmitted by Gateway | Short Description |
| --- | --- | --- | --- | --- |
| 0x02 | LinkCheckReq | x | | Used by an end device to validate its connectivity to a network. |
| 0x02 | LinkCheckAns | | x | Answer to LinkCheckReq command. Contains the received signal power estimation indicating to the end device the quality of reception (link margin). |
| 0x03 | LinkADRReq | | x | Requests the end device to change data rate, transmit power, repetition rate or channel. |
| 0x03 | LinkADRAns | x | | Acknowledges the LinkRateReq. |
| 0x04 | DutyCycleReq | | x | Sets the maximum aggregated transmit duty-cycle of a device. |
| 0x04 | DutyCycleAns | x | | Acknowledges a DutyCycleReq command. |
| 0x05 | RXParamSetupReq | | x | Sets the reception slots parameters. |
| 0x05 | RXParamSetupAns | x | | Acknowledges a RXSetupReq command. |
| 0x06 | DevStatusReq | | x | Requests the status of the end device. |
| 0x06 | DevStatusAns | x | | Returns the status of the end device, namely its battery level and its demodulation margin. |
| 0x07 | NewChannelReq | | x | Creates or modifies the definition of a radio channel. |
| 0x07 | NewChannelAns | x | | Acknowledges a NewChannelReq command. |
| 0x08 | RXTimingSetupReq | | x | Sets the timing of the of the reception slots. |
| 0x08 | RXTimingSetupAns | x | | Acknowledges RXTimingSetupReq command. |
| 0x80 to 0xFF | Proprietary | x | x | Reserved for proprietary network command extensions. |

A MAC command consists of a command identifier (CID) of 1 octet followed by a possibly empty command-specific sequence of octets. Examples for MAC commands are summarized in Table 2.

The length of a MAC command is not explicitly given and must be implicitly known by the MAC implementation. Therefore unknown MAC commands cannot be skipped and the first unknown MAC command terminates the processing of the MAC command sequence. It is therefore advisable to order MAC commands according to the version of the LoRaWAN specification which has introduced a MAC command for the first time. This way all MAC commands up to the version of the LoRaWAN specification implemented can be processed even in the presence of MAC commands The maximum end device transmit duty cycle allowed is given by $$\text{aggregated duty cycle} = \frac{1}{2^{MaxDCycle}}$$

The valid range for MaxDutyCycle is [0:15]. A value of 0 corresponds to "no duty cycle limitation" except the one set by the regional regulation.

An end device answers to a DutyCycleReq with a DutyCycleAns command. The DutyCycleAns MAC reply does not contain any payload.

Next, the physical layer of LoRaWAN will be described. LoRaWAN operates in the 70.1 EU 863-870 MHz ISM Band. As to a EU863-870 Preamble Format, the synchronization words given in Table 3 should be used.

TABLE 3

EU863-870 synch words)

| Modulation | Sync word | Preamble length |
|---|---|---|
| LORA | 0x34 | 8 symbols |
| GFSK | 0xC194C1 | 5 bytes |

In Europe, radio spectrum allocation in the ISM band is defined by ETSI [EN300.220]. The network channels can be freely attributed by the network operator. However the three default channels given in Table 4 must be implemented in every EU868 MHz end device. Those channels are the minimum set that all network gateways should always be listening on.

TABLE 4

EU863-870 default channels)

| Modulation | Bandwidth [kHz] | Channel Frequency [MHz] | FSK Bitrate or LoRa DR/ Bitrate | Nb Channels | Duty cycle |
|---|---|---|---|---|---|
| LoRa | 125 | 868.10 868.30 868.50 | DR0 to DR5/ 0.3--5 kbps | 3 | <1% |

In order to access the physical medium the ETSI regulations impose some restrictions such maximum time the transmitter can be on or the maximum time a transmitter can transmit per hour. The ETSI regulations allow the choice of using either a duty-cycle limitation or a so-called Listen Before Talk Adaptive Frequency Agility (LBT AFA) transmissions management. The current LoRaWAN specification exclusively uses duty-cycled limited transmissions to comply with the ETSI regulations.

The LoRaWAN may enforce a per sub-band duty-cycle limitation. Each time a frame is transmitted in a given sub-band, the time of emission and the on-air duration of the frame are recorded for this sub-band. The same sub-band cannot be used again during the next Toff seconds where:

$$Toff_{subband} = \frac{TimeOnAir}{DutyCycle_{subband}} - TimeOnAir$$

During the unavailable time of a given sub-band, the device may still be able to transmit on another sub-band. If all sub-bands are unavailable, the device has to wait before any further transmission. The device adapts its channel hoping sequence according to the sub-band availability.

Example

A device just transmitted a 0.5 s long frame on one default channel. This channel is in a sub-band allowing 1% duty-cycle. Therefore this whole sub-band (868-868.6) will be unavailable for 49.5 s.

EU868 MHz ISM band end devices should use the following default parameters

Default radiated transmit 1 output power: 14 dBm

EU868 MHz end devices should be capable of operating in the 863 to 870 MHz frequency band and should feature a channel data structure to store the parameters of at least 16 channels. A channel data structure corresponds to a frequency and a set of data rates usable on this frequency. The first three channels correspond to 868.1, 868.3, and 868.5 MHz/DR0 to DR5 and must be implemented in every end device. Those default channels cannot be modified through the NewChannelReq command and guarantee a minimal common channel set between end devices and network gateways.

Table 5 gives the list of frequencies that should be used by end devices to broadcast the JoinReq message. The JoinReq message transmit duty-cycle should never exceed 0.1%.

TABLE 5

EU863-870 JoinReq Channel List)

| Modulation | Bandwidth [kHz] | Channel Frequency [MHz] | FSK Bitrate or LoRa DR/ Bitrate | Nb Channels | Duty cycle |
|---|---|---|---|---|---|
| LoRa | 125 | 868.10 868.30 868.50 | DR0 to DR5/ 0.3-5 kbps | 3 | <0.1% |

Next, examples and application information for LoRaWAN will be described.

Figure 9:
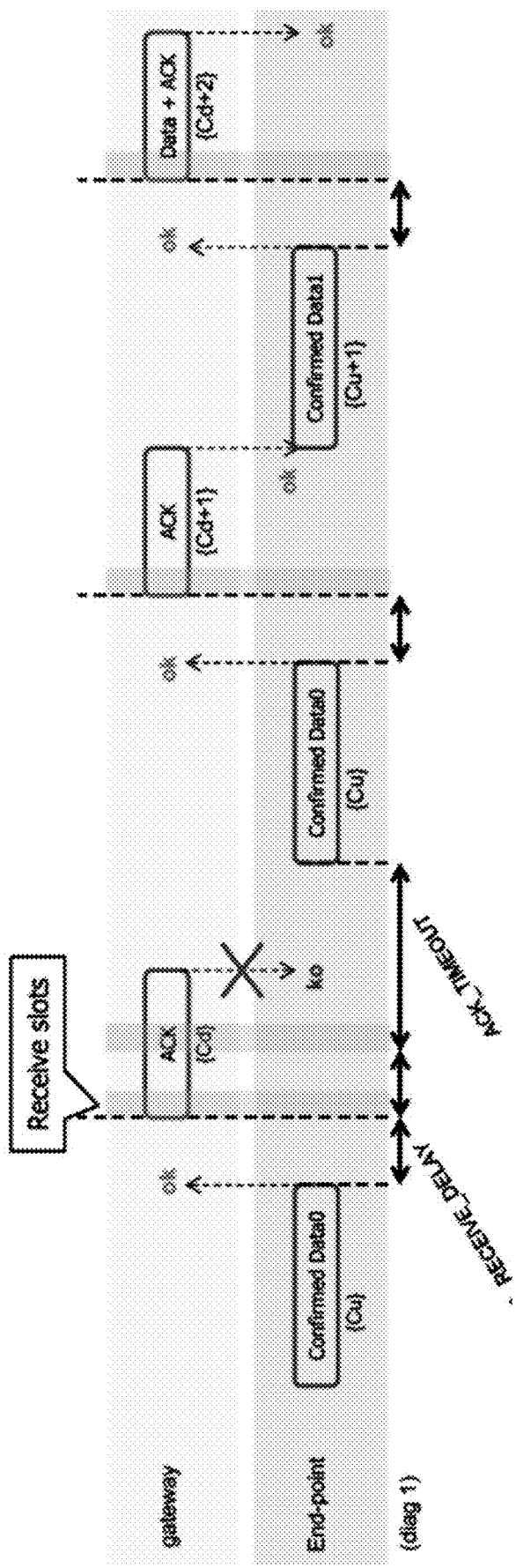
FIG. 9 schematically illustrates an uplink timing diagram in LoRaWAN.

FIG. 9 schematically illustrates an uplink timing diagram for confirmed data messages (confirmed data packets). The figure particularly illustrates the steps followed by an end device trying to transmit two confirmed data frames (Data0 and Data1). The end device first transmits a confirmed data frame containing the Data0 payload at an arbitrary instant and on an arbitrary channel. The frame counter Cu is simply derived by adding 1 to the previous uplink frame counter. The network receives the frame and generates a downlink frame with the ACK bit set exactly RECEIVE_DELAY1 seconds later, using the first receive window of the end device. This downlink frame uses the same data rate and the same channel as the Data0 uplink. The downlink frame counter Cd is also derived by adding 1 to the last downlink towards that specific end device. If there is no downlink payload pending the network shall generate a frame without a payload. In this example the frame carrying the ACK bit is not received.

If an end device does not receive a frame with the ACK bit set in one of the two receive windows immediately following the uplink transmission it may resend the same frame with the same payload and frame counter again at least ACK_TIMEOUT seconds after the second reception window. This resend must be done on another channel and must obey the duty cycle limitation as any other normal transmission. If this time the end device receives the ACK downlink during its first receive window, as soon as the ACK frame is demodulated, the end device is free to transmit a new frame on a new channel.

Next, recommendations on a contract to be provided to the network server in LoRaWAN by the end device provider at the time of provisioning will be described. Configuration data related to the end device and its characteristics must be known by the network server at the time of provisioning. This provisioned data is called the "contract". This contract cannot be provided by the end device and must be supplied by the end device provider using another channel (out-of-band communication). This end device contract may be stored in the network server. It can be used by the application server and the network controller to adapt the algorithms.

This data will include:

End-device specific radio parameters (e.g., device frequency range, device maximal output power, device communication settings—RECEIVE_DELAY1, RECEIVE_DELAY2)

Application type (e.g., Alarm, Metering, Asset Tracking, Supervision, Network Control)

An implementation of the method according to the disclosure in case that the aforementioned network system 1 is a LoRaWAN (e.g., a network system according to the LoRaWAN specification, or a network system comprising a LoRaWAN) will be described next. In this case, the data packets of the first type are confirmed data packets and the data packets of the second type are unconfirmed data packets.

For this implementation, the first command packet is based on an existing LoRaWAN MAC command. In particular, the first command packet conforms to a DutyCycleReq command of LoRaWAN. The DutyCyclePL field of the DutyCycleReq command (i.e., of the DutyCycleReq command embodying the first command packet) includes four bits indicating a value of an upper limit (for a duty cycle) and one bit indicating that the upper limit is to be applied as the first upper limit. The first three bits (e.g., bits 7:5) of the DutyCyclePL field may be RFU bits. The fourth bit (e.g., bit 4:4) may be the one bit (e.g., bit flag) indicating that the upper limit is to be applied as the first upper limit. The last four bits (e.g., bits 3:0) may indicate the actual value of the upper limit.

The DutyCycleReq command may also be used for implementing the second command packet. That is, both the first and second command packets may conform to the DutyCycleReq command of LoRaWAN. Again, the DutyCyclePL field of the DutyCycleReq command includes four bits indicating a value of an upper limit. The DutyCyclePL field further includes one bit that serves to distinguish between the first command packet and the second command packet. That is, the one bit indicates whether the upper limit is to be applied as the first upper limit or the second upper limit. The one bit being set may indicate that the upper limit is to be applied as the first upper limit, i.e., that the respective DutyCycleReq command serves as the first command packet. Conversely, the one bit not being set may indicate that the upper limit is to be applied as the second upper limit, i.e., that the respective DutyCycleReq command serves as the second command packet. In other words, depending on the value of the one bit, the respective DutyCycleReq command is a first command packet or a second command packet. The first three bits (e.g., bits 7:5) of the DutyCyclePL field may be RFU bits. The fourth bit (e.g., bit 4:4) may be the one bit (e.g., bit flag) indicating whether the upper limit is to be applied as the first upper limit (e.g., if the bit is set; in this case the DutyCycleReq command would be a first command packet) or the second upper limit (e.g., if the bit is not set; in this case the DutyCycleReq command would be a second command packet). The last four bits (e.g., bits 3:0) may indicate the actual value of the upper limit.

Figure 10:
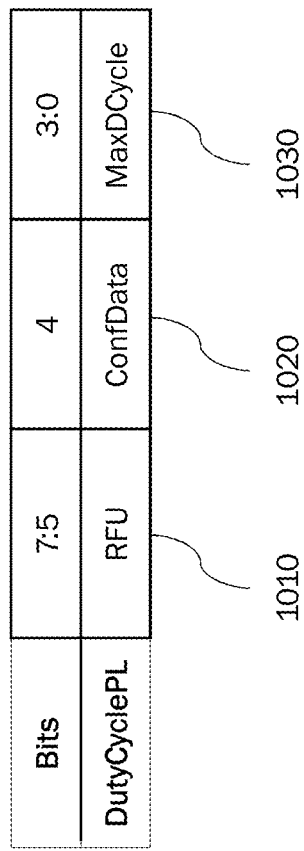
FIG. 10 schematically illustrates an extension of the DutyCycleReq command according to embodiments of the disclosure.

In other words, the network node (e.g., network server) can limit the sending of confirmed data packets (messages) via a LoRaWAN MAC command. For this purpose the use of the DutyCyclePL field in the existing LoRaWAN command DutyCycleReq can be extended as illustrated in FIG. 10. The DutyCyclePL field has 8 bits (1 byte) in total. The first row in FIG. 10 indicates respective bits among these 8 bits in format a:b with a>b, meaning bit position a through bit position b. The second row in FIG. 10 indicates how respective bits are used. As can be seen from the figure, the DutyCyclePL field has three portions 1010, 1020, 1030. The first portion 1010, using 3 bits (bits 7 to 5), includes RFU bits. Notably, the DutyCyclePL field in LoRaWAN (i.e., without the presently proposed extension) includes 4 RFU bits, of which one bit is now used as a ConfData bit (second portion 1020). The ConfData bit is used to indicate to the end device whether the use of the specified Duty Cycle (e.g., upper limit; MaxDCycle) applies globally (e.g., as the second upper limit; ConfData=0) or specifically to Confirmed Data packets (e.g., as the first upper limit; ConfData=1). The specified Duty Cycle is specified in the 4 bits (bits 3 to 0) of the third portion 1030. The duty cycle (e.g., the first upper limit) that is specific for confirmed data will be called the Confirmed data Duty Cycle (CDC). Notably, in this and the following paragraphs, the terms duty cycle and upper limit may be used synonymously. However, it is to be understood that both terms are understood to impose a limitation on transmission by the respective end device. In particular, it is understood that the duty cycles mentioned here serve as an upper limit on the actual duty cycle with which the respective end device transmits packets. The MaxDCycle field keeps the same meaning and format as in the LoRaWAN specification. Accordingly, the actual upper limit on the duty cycle (e.g., the first upper limit, or CDC) is given by $$CDC = \frac{1}{2^{MaxDCycle}}$$

As a result of this command, the respective end device constrains the amount of confirmed data to a volume that complies with the CDC.

As for the global Duty Cycle (e.g., the second upper limit), the value MaxDCycle=0, means "no duty cycle limitation" except the one set by regional regulation.

The maximum value MaxDCycle=15 corresponds to a CDC value of 0.003% which can be used to virtually disable the transmission of confirmed data by the respective end device.

The duty cycle for confirmed data packets shall not exceed the global duty cycle that applies to the totality of transmitted packets.

The meaning and the format of the global Duty Cycle (ConfData=0) is not changed with respect to the LoRaWAN specification.

The corresponding DutyCycleAns MAC command is unchanged, and is used as before to confirm the DutyCycleReq to the network server.

Which end devices are selected for applying the specific CDC, and which CDC values are allocated to them, may depend on one hand on agreements with applications providers, casted in SLAs. Another decision criterion can be based on statistical information gathered by the network server on the success rates of the transmissions of the end devices over a period of time. End devices with a good track record of successful transmissions for unconfirmed data can be identified and selected for this. Well selected retransmission counters (NbTrans) combined with the possibility to prematurely terminate such retransmission sequences, guarantee on one hand a high QoS level, and on the other hand can avoid unnecessary retransmissions, and all this based on mechanisms that are under full network server control, and fully enabled by the current LoRaWAN standard. Another decision criterion may be based on a condition of the network system (e.g., a network traffic).

An example embodiment of the invention has been described above with reference to the LoRaWAN specification. However, the present invention shall not be construed as being limited in its applicability to networks according to the LoRaWAN specification. Rather, the invention is applicable to a wide range of networks. In particular, the invention is applicable to networks in which transmission takes place in an un-licensed frequency spectrum or band, and/or in which transmission proceeds in an un-slotted (e.g., ALOHA-type) manner.

Without intended limitation, the invention may be applied to the following standards:

NB-IoT (Narrow-Band Internet of Things)—A technology being standardized by the 3GPP standards body.

LTE-MTC (LTE-Machine Type Communication)—This standards-based family of technologies supports several technology categories, such as Cat-1 and CatM1, suitable for the IoT.

EC-GSM-IoT (Extended Coverage-GSM-IoT)—Enables new capabilities of existing cellular networks for LPWA IoT applications. EC-GSM-IoT can be activated through new software deployed over a very large GSM footprint, adding even more coverage to serve IoT devices.

LoRaWAN—A network protocol intended for wireless battery operated Things in regional, national or global network.

RPMA (Random phase multiple access)—A technology communication system employing direct-sequence spread spectrum (DSSS) with multiple access.

Sigfox—A wireless communication system that enables remote devices to connect using ultra-narrow band (UNB) technology.

It should be noted that method features described above correspond to respective apparatus features (both of a network node, or network server, and an end device) that may however not be described explicitly, for reasons of conciseness. The disclosure of the present document is considered to extend also to such apparatus features.

It should be noted that the description and drawings merely illustrate the principles of the proposed method. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed method. Furthermore, all statements herein providing principles, aspects, and embodiments of the invention, as well as specific examples thereof, are intended to encompass equivalents thereof.

The invention claimed is:

1. A method of data transmission in a network system including a network node and an end device, wherein the end device can transmit data packets of a first type and data packets of a second type to the network node, and wherein the network node is required to send a confirmation to the end device upon reception of a data packet of the first type and is not required to send a confirmation to the end device upon reception of a data packet of the second type, the method comprising:

transmitting, by the network node, a first type of command packet including an indication of a first upper limit towards the end device, the first upper limit being an upper limit for a first duty cycle applicable to transmission of the data packets of the first type by the end device, the first upper limit not applicable to the data packets of the second type, wherein a duty cycle indicates, for a given device, a fraction of time during which transmission occurs;

transmitting, by the network node, a second type of command packet including an indication of a second upper limit towards the end device, the second upper limit being an upper limit for a second duty cycle applicable to transmission of data packets of both the first type and the second type by the end device; and receiving, by the network node, the data packets of the first type in accordance with a duty cycle that is smaller than or equal to the first upper limit indicated by the first type of command packet and the second upper limit indicated by the second type of command packet.

2. The method according to claim 1, further comprising: determining, by the network node, the first upper limit based on a network condition of the network system.

3. The method according to claim 1, wherein
the first type of command packet includes the indication of the first upper limit as well as an indication that the first upper limit is to be applied by the end device to the duty cycle for transmission of the data packets of the first type.

4. The method according to claim 1, further comprising: determining, by the network node, the second upper limit for the second duty cycle for transmission of the first type data packets and the second type data packets by the end device; and receiving, by the network node, packets of any one of the first type and the second type in accordance with a duty cycle that is smaller than or equal to the second upper limit indicated by the second type of command packet.

5. The method according to claim 4, wherein
the network system is a network system according to the LoRaWAN specification,
the data packets of the first type are confirmed data packets and the data packets of the second type are unconfirmed data packets,
the first and second types of command packets each conform to a DutyCycleReq command, and
the DutyCyclePL field of the DutyCycleReq command includes four bits indicating a value of an upper limit and one bit indicating whether the upper limit is to be applied as the first upper limit or the second upper limit.

6. The method according to claim 1, wherein
the network system is a network system according to the LoRaWAN specification,
the data packets of the first type are confirmed data packets and the data packets of the second type are unconfirmed data packets,
the first type of command packet conforms to a DutyCycleReq command, and the DutyCyclePL field of the DutyCycleReq command includes four bits indicating a value of an upper limit and one bit indicating that the upper limit is to be applied as the first upper limit.

7. A network node for use in a network system including the network node and an end device, wherein the end device can transmit data packets of a first type and data packets of a second type to the network node, and wherein the network node is required to send a confirmation to the end device upon reception of a data packet of the first type and is not required to send a confirmation to the end device upon reception of a data packet of the second type, wherein the network node comprises a processor and a memory with instructions stored thereon, the instructions being executable by the processor, and wherein the processor is configured to cause the network node to:

transmit a first type of command packet including an indication of a first upper limit towards the end device, the first upper limit being an upper limit on a first duty cycle applicable to transmission of the data packets of the first type by the end device, the first upper limit not applicable to the data packets of the second type, and transmit a second type of command packet including an indication of a second upper limit towards the end device, the second upper limit being an upper limit on a second duty cycle applicable to transmission of data packets of both the first type and the second type by the end device, such that the end device is instructed to transmit the data packets of the first type in accordance with a duty cycle that is smaller than or equal to the first upper limit indicated by the first type of command packet and the second upper limit indicated by the second type of command packet, wherein a duty indicates, for a given device, a fraction of time during which transmission occurs.

8. The network node according to claim 7, wherein the network node is further configured to:

determine the first upper limit based on a network condition of the network system.

9. The network node according to claim 7, wherein the network node is further configured to:

determine the second upper limit for the second duty cycle for transmission of the first type data packets and the second type data packets by the end device; and receive packets of any one of the first type and the second type in accordance with a duty cycle that is smaller than or equal to the second upper limit indicated by the second type of command packet.

10. The network node according to claim 9, wherein the network system is a network system according to the LoRaWAN specification, the data packets of the first type are confirmed data packets and the data packets of the second type are unconfirmed data packets, the first and second types of command packets each conform to a DutyCycleReq command, and the DutyCyclePL field of the DutyCycleReq command includes four bits indicating a value of an upper limit and one bit indicating whether the upper limit is to be applied as the first upper limit or the second upper limit.

11. The network node according to claim 7, wherein the network system is a network system according to the LoRaWAN specification, the data packets of the first type are confirmed data packets and the data packets of the second type are unconfirmed data packets, the first type of command packet conforms to a DutyCycleReq command, and the DutyCyclePL field of the DutyCycleReq command includes four bits indicating a value of an upper limit and one bit indicating that the upper limit is to be applied as the first upper limit.

12. An end device for use in a network system comprising a network node and the end device, wherein the end device comprises a processor and a memory with instructions stored thereon, the instructions being executable by the processor, and wherein the processor is configured to cause the end device to:

transmit data packets of a first type and data packets of a second type towards the network node, wherein the data packets of the first type are data packets for which the network node is required to send a confirmation upon reception and the data packets of the second type are data packets for which the network node is not required to send a confirmation upon reception;

receive a first type of command packet from the network node, the first type of command packet including an indication of a first upper limit for a first duty cycle applicable to transmission of the data packets of the first type by the end device, the first upper limit not applicable to the data packets of the second type, wherein a duty cycle indicates, for a given device, a fraction of time during which transmission occurs;

receive a second type of command packet from the network node, the second type of command packet including an indication of a second upper limit to the end device, the second upper limit being an upper limit applicable to a second duty cycle for transmission of data packets of both the first type and the second type by the end device; and transmit the data packets of the first type in accordance with a duty cycle that is smaller than or equal to the first upper limit indicated by the first type of command packet and the second upper limit indicated by the second type of command packet.

13. The end device according to claim 12, further configured to:

transmit packets of any one of the first type and the second type in accordance with a duty cycle that is smaller than or equal to the second upper limit indicated by the second type of command packet.

14. The end device according to claim 13, wherein the network system is a network system according to the LoRaWAN specification, the data packets of the first type are confirmed data packets and the data packets of the second type are unconfirmed data packets, the first and second types of command packets each conform to a DutyCycleReq command, and the DutyCyclePL field of the DutyCycleReq command includes four bits indicating a value of an upper limit and one bit indicating whether the upper limit is to be applied as the first upper limit or the second upper limit.

15. The end device according to claim 12, wherein the network system is a network system according to the LoRaWAN specification, the data packets of the first type are confirmed data packets and the data packets of the second type are unconfirmed data packets, the first type of command packet conforms to a DutyCycleReq command, and the DutyCyclePL field of the DutyCycleReq command includes four bits indicating a value of an upper limit and one bit indicating that the upper limit is to be applied as the first upper limit.

16. The end device according to claim 12, wherein the end device further comprises at least one of a sensor, detector, or any combinations thereof.

17. The end device according to claim 16, wherein the processor is further configured to:

transmit sensed values and/or detected values towards the network node.

18. The end device according to claim 12, wherein the end device further comprises a transmitter, the transmitter coupled to the processor; and the processor is further configured to instruct the transmitter to transmit the data packets of the first type and/or the data packets of the second type in accordance with applicable duty cycles/upper limits.

19. The end device according to claim 12, wherein the processor is further configured to transmit the data packets using an un-licensed frequency spectrum or frequency band.

* * * * *